United States Patent
Pu et al.

(10) Patent No.: US 12,028,505 B2
(45) Date of Patent: Jul. 2, 2024

(54) IMAGE SENSING DEVICE AND HEAD-MOUNTED DISPLAY

(71) Applicant: HTC Corporation, Taoyuan (TW)

(72) Inventors: Ta-Chun Pu, Taoyuan (TW);
Chun-Yih Wu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 141 days.

(21) Appl. No.: 17/853,961

(22) Filed: Jun. 30, 2022

(65) Prior Publication Data

US 2024/0007604 A1 Jan. 4, 2024

(51) Int. Cl.
| | |
|---|---|
| *H04N 13/239* | (2018.01) |
| *G01S 13/89* | (2006.01) |
| *G06V 20/20* | (2022.01) |
| *H01Q 3/00* | (2006.01) |
| *H04N 13/332* | (2018.01) |

(52) U.S. Cl.
CPC ........... *H04N 13/239* (2018.05); *G01S 13/89* (2013.01); *G06V 20/20* (2022.01); *H01Q 3/00* (2013.01); *H04N 13/332* (2018.05)

(58) Field of Classification Search
CPC .... H04N 13/239; H04N 13/332; G06V 20/20; G01S 13/89; H01Q 3/00
See application file for complete search history.

(56) References Cited

U.S. PATENT DOCUMENTS

| | | | | |
|---|---|---|---|---|
| 2013/0194141 | A1* | 8/2013 | Okajima | H04B 1/385 343/718 |
| 2016/0005233 | A1* | 1/2016 | Fraccaroli | G06F 3/0487 345/633 |
| 2017/0310907 | A1* | 10/2017 | Wang | G02B 1/041 |
| 2017/0365231 | A1* | 12/2017 | Rider | G06F 3/147 |
| 2019/0027113 | A1* | 1/2019 | Kaine | G06F 3/012 |
| 2020/0057252 | A1* | 2/2020 | Chang | H04N 23/67 |

(Continued)

FOREIGN PATENT DOCUMENTS

| | | |
|---|---|---|
| TW | 202134737 | 9/2021 |
| TW | 202146979 | 12/2021 |
| TW | I759508 | 4/2022 |

(Continued)

OTHER PUBLICATIONS

"Office Action of Taiwan Counterpart Application", issued on Sep. 11, 2023, p. 1-p. 5.

*Primary Examiner* — Rowina J Cattungal
(74) *Attorney, Agent, or Firm* — JCIPRNET

(57) ABSTRACT

An image sensing device, including multiple lens groups, a connector, at least one antenna element, and multiple image sensing elements, is provided. Each lens group includes multiple lens elements arranged along an optical axis from a first side. The connector includes multiple first parts and multiple second parts. The second parts are connected between the first parts. The antenna elements are respectively disposed on the first parts and are configured to provide multiple sensing beams to a target area toward the first side. The image sensing elements are respectively disposed on a side of the lens groups facing a second side and are configured to sense a reflected light beam of the target area. The direction of the second side is opposite to the direction of the first side.

22 Claims, 5 Drawing Sheets

(56) References Cited

U.S. PATENT DOCUMENTS

2020/0099832 A1* 3/2020 Chang ............... H01L 27/14618
2021/0200305 A1* 7/2021 Uhm ..................... G06F 3/0304

FOREIGN PATENT DOCUMENTS

| TW | I761575 | 4/2022 |
| WO | 2016186257 | 11/2016 |
| WO | 2022133219 | 6/2022 |

* cited by examiner

IMAGE SENSING DEVICE AND HEAD-MOUNTED DISPLAY

TECHNICAL FIELD

The disclosure relates to an electronic device and more particularly, to an image sensing device and a head-mounted display.

DESCRIPTION OF RELATED ART

With advancements in the technology industry, the types, functions, and ways of use of electronic devices are becoming more and more diverse, and wearable electronic devices that can be directly worn on a user's body are correspondingly being generated. There are quite a lot of types of head-mounted electronic devices. Taking head-mounted electronic devices such as eye masks as an example, after wearing such electronic devices, in addition to seeing stereoscopic images, the image also changes as the user's head turns, providing the user with a more immersive experience.

However, in the current head-mounted electronic device design, there are various modules with different functions in the structure, resulting in the big size of the head-mounted electronic device. In addition, the current development also has the problem that the coverage or the diversity characteristics of the radar beam is limited by the limited number of antenna elements. It is also a problem to have both imaging and radar sensors at specific locations on the head-mounted electronic device.

SUMMARY

The disclosure provides an image sensing device and a head-mounted display, which integrates an antenna and an image sensing element into a single module to form an optimal sensing position, and hence beam directions or scanning areas are increased. The image sensing device of the disclosure may be used in a head-mounted display, a vehicle device, a robot, or an unmanned aerial vehicle. Augmented reality or virtual reality accessories are also configured with the image sensing device of the disclosure, such as controllers, wristbands, and rings. In addition, the image sensing device may also be configured in a device with spatial recognition requirements.

The disclosure provides an image sensing device including multiple lens groups, a connector, multiple antenna elements, and multiple image sensing elements. Each lens group includes multiple lens elements arranged along an optical axis. The connector is connected between the lens groups. The connector includes multiple first parts and multiple second parts. The second parts are connected between the first parts. The antenna elements are respectively disposed on the first parts and configured to provide multiple sensing beams to a target area toward the first side. The image sensing elements are respectively disposed on a side of the lens groups facing the second side and configured to sense a reflected light beam of the target area. The direction of the second side is opposite to the direction of the first side.

The disclosure further provides a head-mounted display including an image sensing device and a display. The image sensing device includes multiple lens groups, a connector, multiple antenna elements, and multiple image sensing elements. Each lens group includes multiple lens elements arranged along an optical axis. The connector is connected between the lens groups. The connector includes multiple first parts and multiple second parts. The second parts are connected between the first parts. The antenna elements are respectively disposed on the first parts and configured to provide multiple sensing beams to a target area toward the first side. The image sensing elements are respectively disposed on a side of the lens groups facing the second side and configured to sense a reflected light beam of the target area. The direction of the second side is opposite to the direction of the first side. The head-mounted display has a main board disposed inside, and the image sensing device is coupled to the main board via a signal line.

The disclosure further provides an image sensing device including a lens group, multiple antenna elements, and an image sensing element. The lens group includes multiple lens elements arranged along an optical axis. The antenna elements are disposed on the second side of the lens group and configured to provide multiple sensing beams to a target area. The antenna elements are located at different relative positions of the lens group. The image sensing element is disposed on the second side of the lens group, and configured to sense a reflected light beam of the target area.

The disclosure further provides a head-mounted display including an image sensing device and a display. The image sensing device includes a lens group, multiple antenna elements, and an image sensing element. The lens group includes multiple lens elements arranged along an optical axis. The antenna elements are disposed on the second side of the lens group and configured to provide multiple sensing beams to a target area. The antenna elements are located at different relative positions of the lens group. The image sensing element is disposed on the second side of the lens group, and configured to sense a reflected light beam of the target area. The display is electrically connected to the image sensing device.

Based on the above, in the image sensing device and the head-mounted display of the disclosure, the image sensing device includes a lens group, multiple antenna elements, and an image sensing element. The sensing beams provided by the antenna elements are transmitted through the lens group to the target area to form a scanning beam, and the reflected light beam reflected from the target area is transmitted through the lens group to the image sensing element. Therefore, by arranging multiple antenna elements adjacent to the lens group, the reflected light beam provided by the target area and the sensing beam provided by the antenna elements may share the lens group, and hence be integrated into a single module to be disposed on an optimal sensing position. The size of the device is then reduced at the same time. In addition, by disposing the position adjuster to move the lens group, an optical shock absorption effect is provided. Hence, beam directions or scanning areas of the scanning beam are increased.

In order to make the above-mentioned features and advantages of the disclosure comprehensible, embodiments accompanied with drawings are described in detail below.

DESCRIPTION OF EMBODIMENTS

Figure 1:
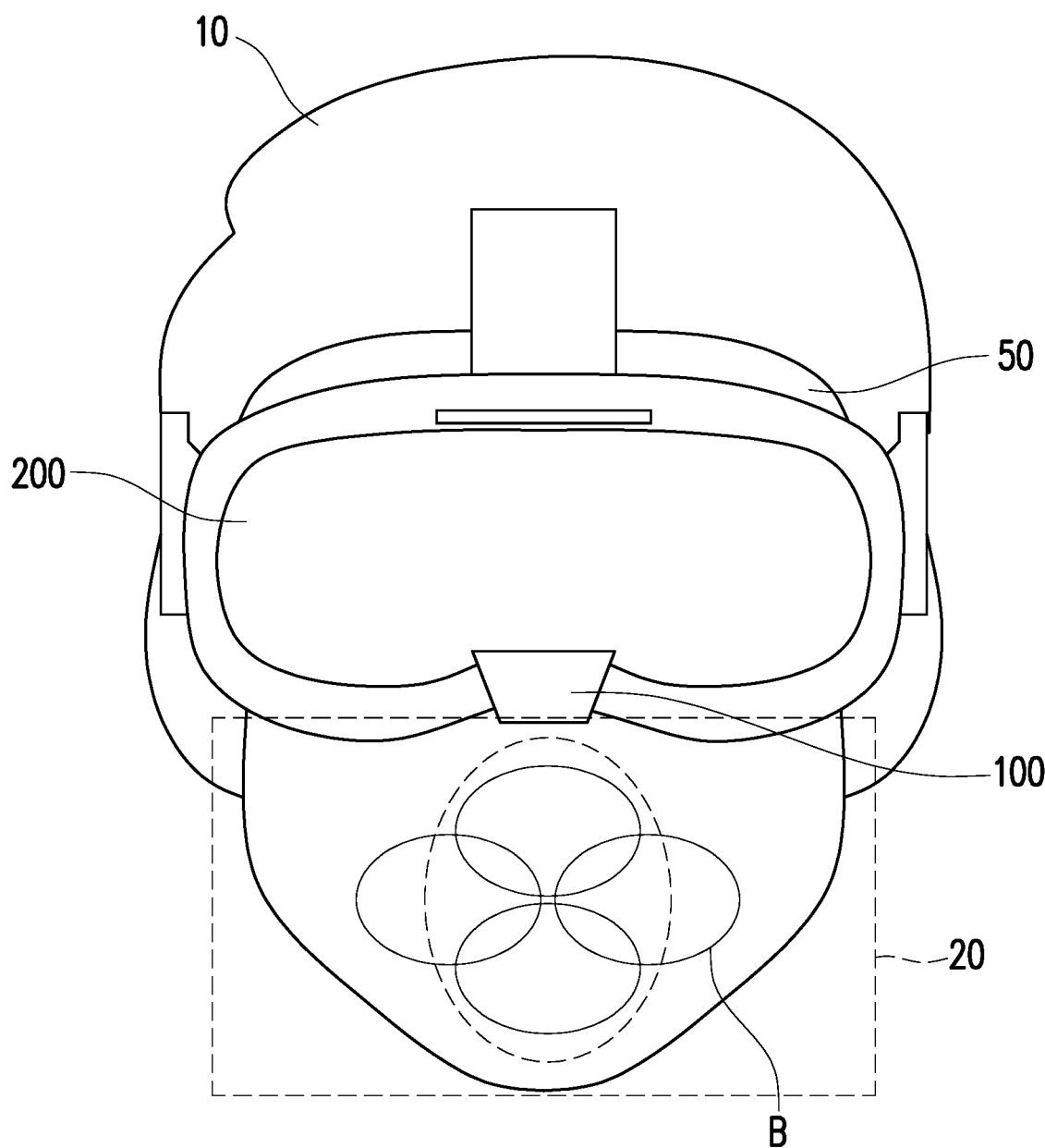
FIG. 1 is a schematic view of a head-mounted display of an embodiment of the disclosure.

FIG. 1 is a schematic view of a head-mounted display of an embodiment of the disclosure. Please refer to FIG. 1. An embodiment of the disclosure provides a head-mounted display 50 that can be worn by a user 10 to experience the effects of virtual reality, augmented reality, or mixed reality. In this embodiment, the head-mounted display 50 includes an image sensing device 100 and a display 200. The image sensing device 100 is configured to sense the target area 20. The display 200 is electrically connected to the image sensing device 100, thereby generating an image according to the sensing result of the image sensing device 100.

Figure 2:
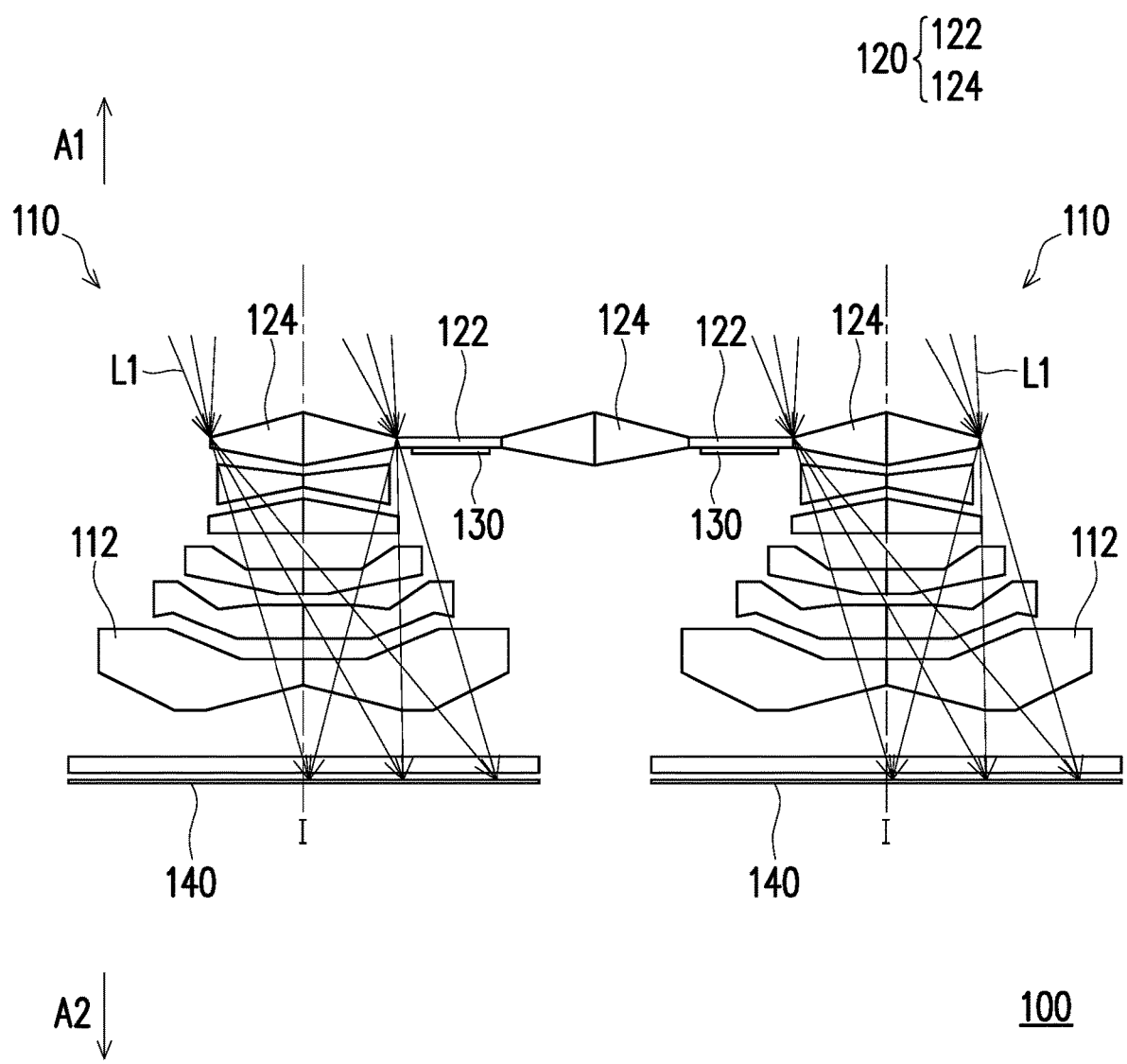
FIG. 2 is a schematic view of the image sensing device of the image sensing device of FIG. 1 when performing optical sensing.
Figure 3:
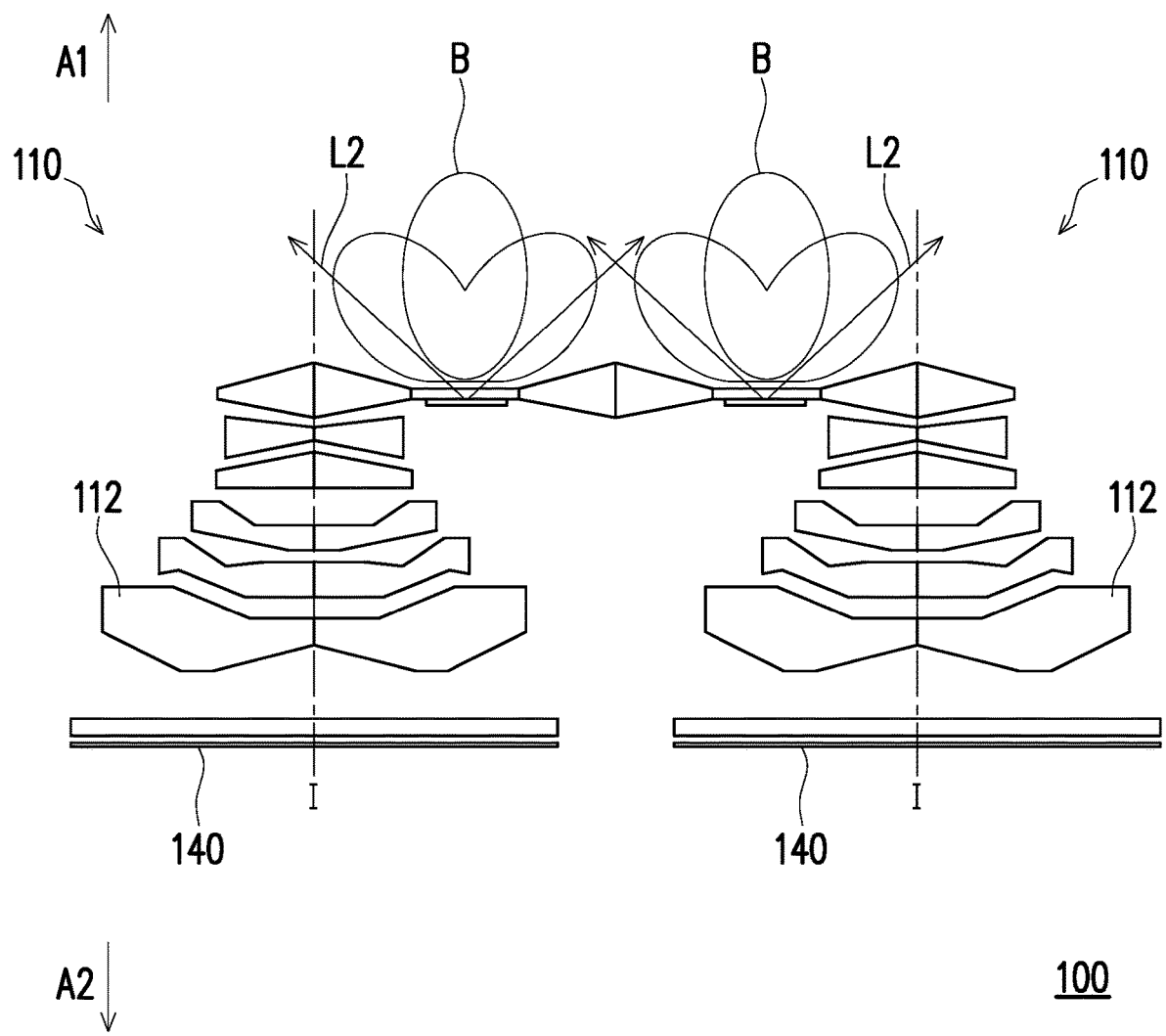
FIG. 3 is a schematic view of the image sensing device of the image sensing device of FIG. 1 when performing beam scanning.

FIG. 2 is a schematic view of the image sensing device of the image sensing device of FIG. 1 when performing optical sensing. FIG. 3 is a schematic view of the image sensing device of the image sensing device of FIG. 1 when performing beam scanning. Please refer to FIG. 1 to FIG. 3. The image sensing device includes multiple lens groups 110, a connector 120, multiple antenna elements 130, and multiple image sensing elements 140. In this embodiment, the number of lens groups 110 is, for example, two. In addition, the lens groups are arranged in a direction perpendicular to the optical axis I. However, the disclosure is not limited thereto. Specifically, each lens group 110 includes multiple lens elements 112 arranged along an optical axis I. For example, each lens group 110 includes, for example, a combination of one or more optical lenses with diopter, such as various combinations of non-planar lenses including biconcave lenses, biconvex lenses, meniscus lenses, convex-concave lenses, plano-convex lenses, and plano-concave lenses. In this embodiment, the optical imaging range of the lens elements 112 in each lens group 110 on the optical axis I gradually increases from the first side A1 to the second side A2, as shown in FIG. 2.

The connector 120 is connected between the lens groups 110. The connector includes multiple first parts 122 and multiple second parts 124. The second parts 124 are connected between the first parts 122. In addition, as shown in FIG. 2, the thicknesses of the second parts 124 are greater than the thicknesses of the first parts 122, so the dielectric constants of the second parts 124 are greater than the dielectric constants of the first parts 122 constant. However, the thicknesses of the second parts 124 may also be smaller than the thicknesses of the first parts 122, so the dielectric constants of the second parts 124 may also be smaller than the dielectric constants of the first parts 122 constant. For example, in this embodiment, the connector 120 is an optical lens, and the thickness of the first parts 122 in the direction of the optical axis I is less than the thickness of the second parts 124 in the direction of the optical axis I. Specifically, in this embodiment, the connector 120 is connected to a side of the lens groups 110 facing the first side A1.

The image sensing elements 140 are respectively disposed on a side of the lens groups 110 facing the second side A2. The number of the image sensing elements 140 is the same as the number of the lens groups 110. The image sensing elements 140 are configured to sense a reflected light beam L1 of the target area 20, thereby optically imaging the facial appearance of the target area 20 of the user 10. Specifically, the reflected light beam L1 emitted from the target area 20 is transmitted from the first side A1 to the second side A2 through the lens group 110 to the image sensing element 150.

The antenna elements 130 are respectively disposed on the first parts 122 and configured to provide multiple sensing beams L2 to a target area 20 toward the first side A1. Specifically, in this embodiment, the number of the antenna elements 130 is the same as the number of the first parts 122, and the antenna elements 130 are respectively disposed in the corresponding first parts 122 toward a side of the second side A2. Nevertheless, the disclosure does not limit the number of the antenna element 130 and the number of the first parts 122. In other words, the antenna elements 130 face toward the first parts 122 for providing multiple sensing beams L2 toward the first parts 122 to form a scanning beam B in the target area 20. It is worth mentioning that, since the second parts 124 are disposed adjacent to the first part 122, part of the sensing beams L2 is deflected toward the second parts 124 with greater dielectric constants, thereby increasing the scanning area of the formed scanning beam B, as shown in FIG. 3. In this way, the viewing angle range of the sensing beams L2 is further improved when the face of the user 10 is approaching, thereby achieving a good sensing effect. On the other hand, by arranging multiple antenna elements 130 adjacent to the lens group 110, the reflected light beam L1 provided by the target area 20 and the sensing beam L2 provided by the antenna elements 130 may share the lens group 110, as shown in FIG. 2 and FIG. 3 respectively. Hence, they are integrated into a single module to form an optimal sensing position. The size of the device is then reduced at the same time.

Figure 4:
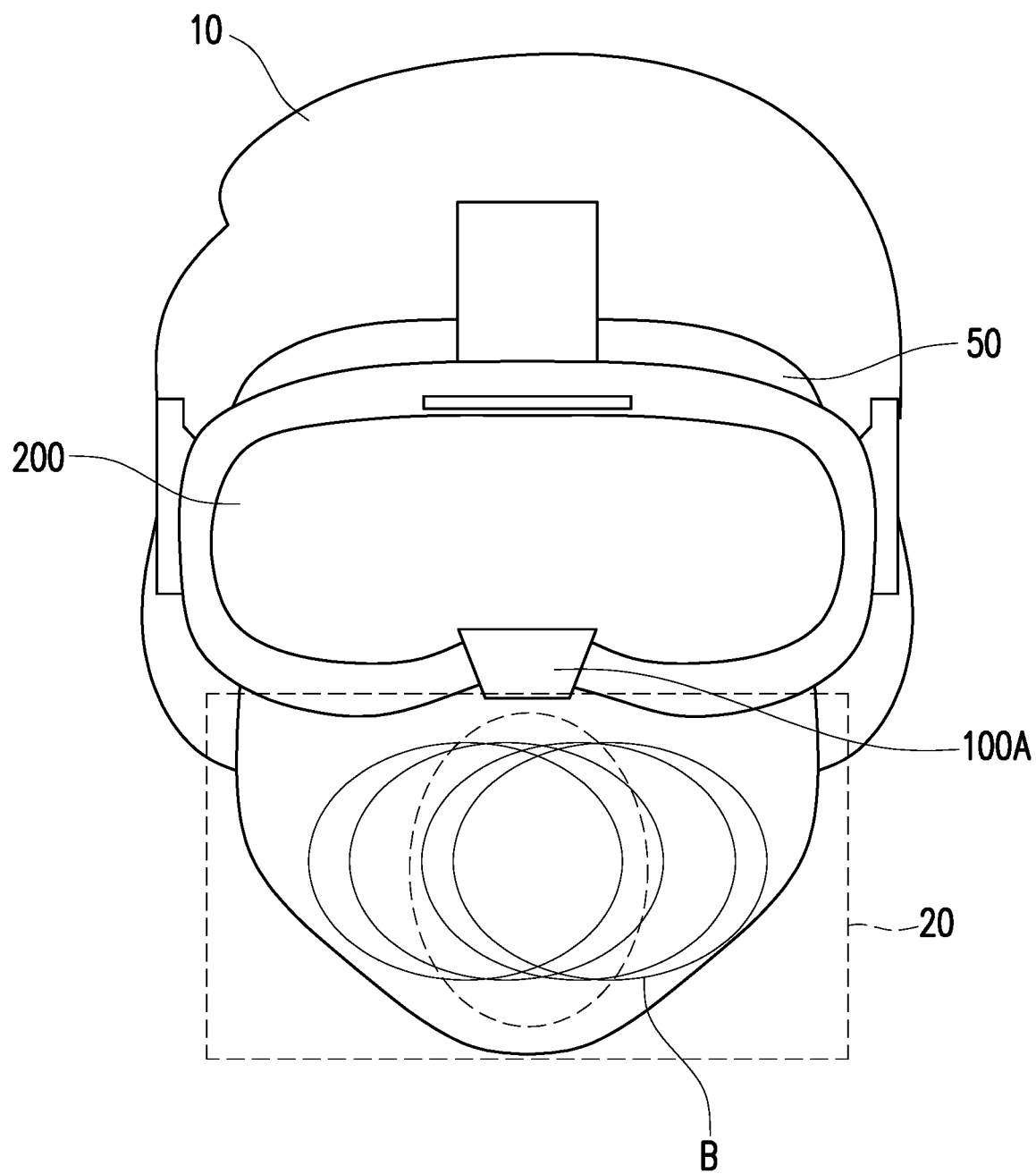
FIG. 4 is a schematic view of a head-mounted display of yet another embodiment of the disclosure.
Figure 5:
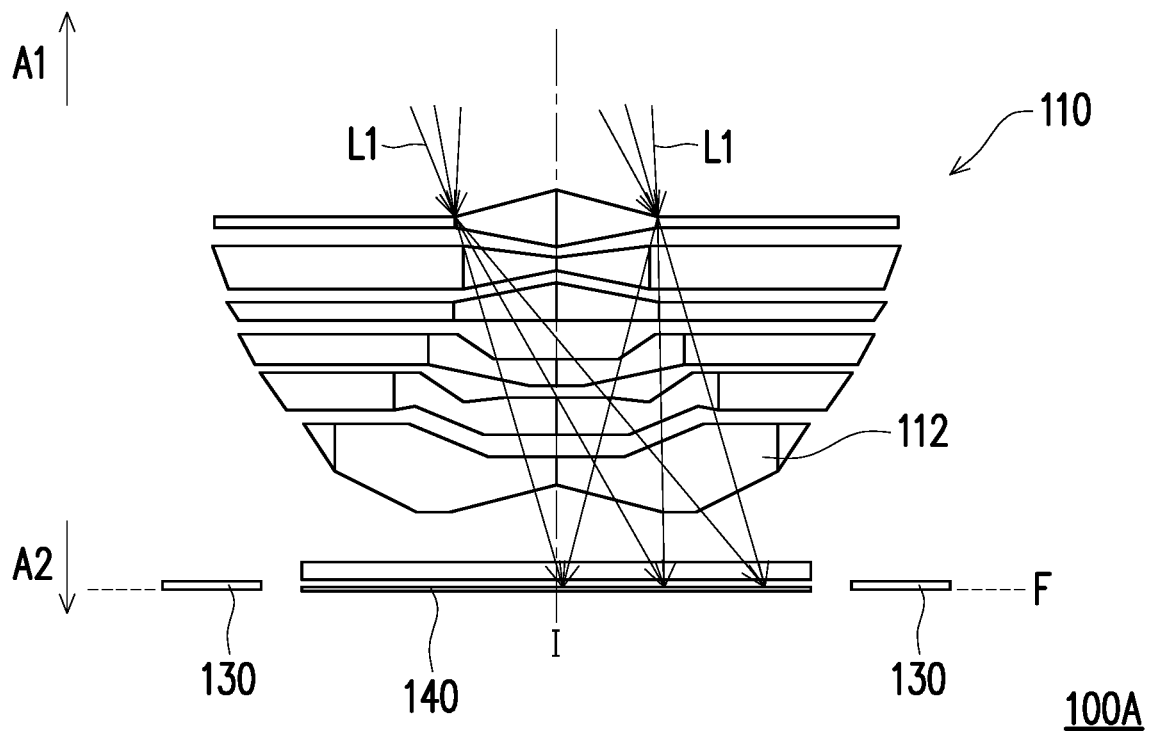
FIG. 5 is a schematic view of the image sensing device of the image sensing device of FIG. 4 when performing optical sensing.
Figure 6:
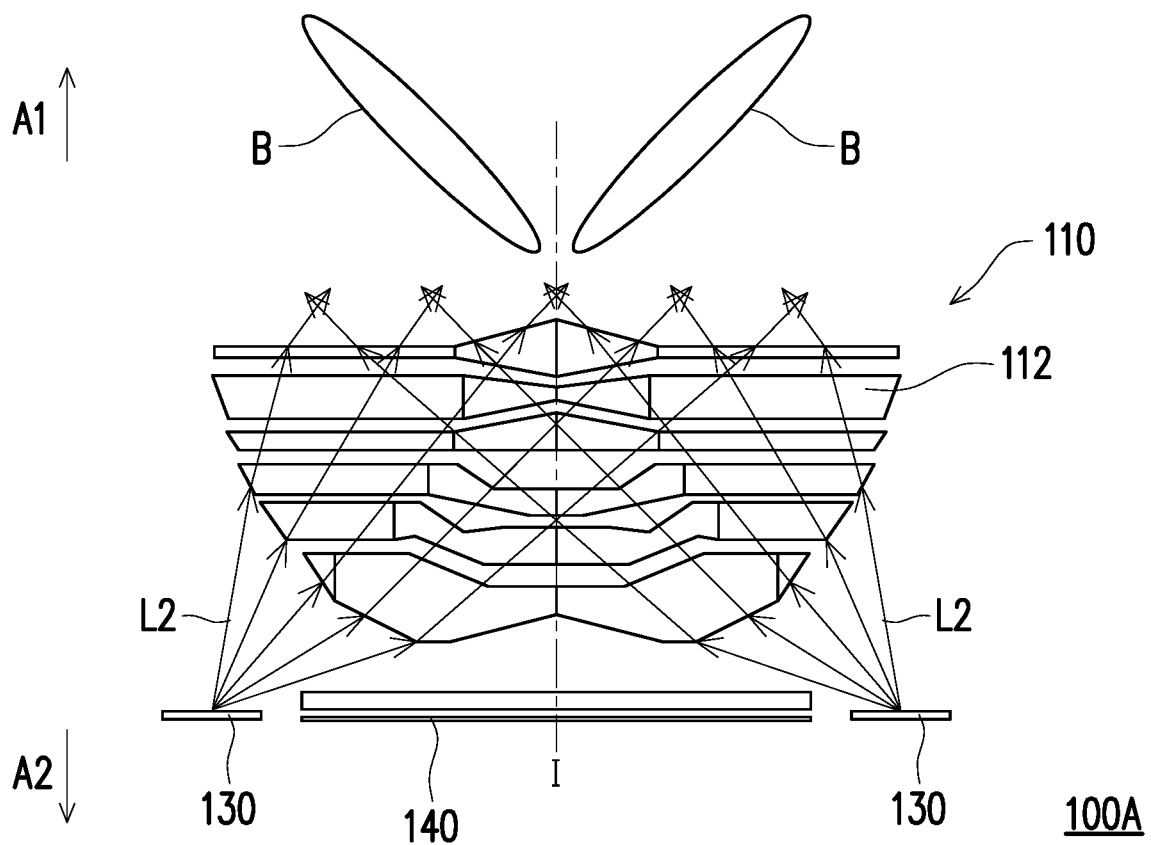
FIG. 6 is a schematic view of the image sensing device of the image sensing device of FIG. 4 when performing beam scanning.

FIG. 4 is a schematic view of a head-mounted display of yet another embodiment of the disclosure. FIG. 5 is a schematic view of the image sensing device of the image sensing device of FIG. 4 when performing optical sensing. FIG. 6 is a schematic view of the image sensing device of the image sensing device of FIG. 4 when performing beam scanning. Please refer to FIG. 4 to FIG. 6. The head-mounted display 200 and the image sensing device 100A of this embodiment are similar to the head-mounted display 200 and the image sensing device 100 shown in FIG. 1 to FIG. 3. The difference between the two is that, in this embodiment, only one group of the lens group 110 and the image sensing element 140 of the image sensing device 100 are provided, and the connector 120 in FIG. 2 is omitted. In addition, in this embodiment, multiple antenna elements 130 are disposed on the second side A2 of the lens group 110, and these antenna elements 130 are located at different relative positions of the lens group 110 to form a scanning beam B with a specific direction. Specifically, the sensing beam L2 provided by the antenna element 130 is transmitted from the second side A2 to the first side A1 through the lens group 120 to the target area 20. The optical imaging range of the lens elements 112 on the optical axis I gradually decreases from the first side A1 to the second side A2. For example, in this embodiment, the antenna elements 130 are disposed around the lens group 110, and the orthographic projections of the antenna elements 130 on the reference plane F surrounds the orthographic projection of the lens group 110 on the reference plane F. The extension direction of the reference plane F is perpendicular to the extension direction of the optical axis I.

Therefore, in this embodiment, the sensing beams L2 respectively provided by the antenna elements 130 is transmitted to different surface areas of the target area 20 through the optical effect of the lens group 110 to form scanning beam B with different illumination areas, as shown in FIG. 4. In other words, in the image sensing device 100A of this embodiment, the antenna elements 130 are disposed adjacent to the lens group 110, so that the reflected light beam L1 provided by the target area 20 and the sensing beam L2 provided by the antenna elements 130 may share the lens group 110, as shown in FIG. 5 and FIG. 6 respectively. Hence, the antenna elements 130 and the image sensing elements 140 are integrated into a single module to form a better sensing position. The size of the device is then reduced at the same time.

To sum up, in the image sensing device and the head-mounted display of the disclosure, the image sensing device includes a lens group, multiple antenna elements, and an image sensing element. The sensing beams provided by the antenna elements are transmitted through the lens group to the target area to form a scanning beam, and the reflected light beam reflected from the target area is transmitted through the lens group to the image sensing element. Therefore, by arranging multiple antenna elements adjacent to the lens group, the reflected light beam provided by the target area and the sensing beam provided by the antenna elements may share the lens group, and hence be integrated into a single module to form an optimal sensing position. The size of the device is then reduced at the same time. In addition, by disposing the position adjuster to move the lens group, an optical shock absorption effect is provided. Hence, beam directions or scanning areas of the scanning beam are increased.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An image sensing device, comprising:
    a plurality of lens groups, each of the lens groups comprising a plurality of lens elements arranged along an optical axis;
    a connector, connected between the lens groups and comprising:
    a plurality of first parts; and
    a plurality of second parts, connected between the first parts;
    a plurality of antenna elements, respectively disposed on the first parts and configured to provide a plurality of sensing beams to a target area toward a first side; and
    a plurality of image sensing elements, respectively disposed on a side of the lens groups facing a second side and configured to sense a reflected light beam of the target area, wherein a direction of the second side is opposite to a direction of the first side.

2. The image sensing device according to claim 1, wherein an optical imaging range of the lens elements on the optical axis gradually increases from the first side to the second side.

3. The image sensing device according to claim 1, wherein the connector is an optical lens, and a thickness of the first parts in a direction of the optical axis is less than a thickness of the second parts in the direction of the optical axis.

4. The image sensing device according to claim 1, wherein the connector is connected to a side of the lens groups facing the first side.

5. The image sensing device according to claim 1, wherein the antenna elements are located on a side of the first parts facing the second side.

6. The image sensing device according to claim 1, wherein the image sensing device is used in a head-mounted display, a vehicle device, a robot, or an unmanned aerial vehicle.

7. The image sensing device according to claim 1, wherein the image sensing device is used in an accessory for augmented reality or virtual reality of a controller, a wristband, and a ring, and the image sensing device is configured in a device with spatial recognition requirements.

8. A head-mounted display, comprising: an image sensing device, comprising:
    a plurality of lens groups, each of the lens groups comprising a plurality of lens elements arranged along an optical axis;
    a connector, connected between the lens groups and comprising:
    a plurality of first parts; and
    a plurality of second parts, connected between the first parts;
    a plurality of antenna elements, respectively disposed on the first parts and configured to provide a plurality of sensing beams to a target area toward a first side;
    a plurality of image sensing elements, respectively disposed on a side of the lens groups facing a second side and configured to sense a reflected light beam of the target area, wherein a direction of the second side is opposite to a direction of the first side; and
    a main board, wherein the image sensing device is coupled to the main board via a signal line.

9. The head-mounted display according to claim 8, wherein an optical imaging range of the lens elements on the optical axis gradually increases from the first side to the second side.

10. The head-mounted display according to claim 8, wherein the connector is an optical lens, and a thickness of the first parts in a direction of the optical axis is less than a thickness of the second parts in the direction of the optical axis.

11. The head-mounted display according to claim 8, wherein the connector is connected to a side of the lens groups facing the first side.

12. The head-mounted display according to claim 8, wherein the antenna elements are located on a side of the first parts facing the second side.

13. An image sensing device, comprising:
    a lens group, comprising a plurality of lens elements arranged along an optical axis;
    a plurality of antenna elements, disposed on a side of the lens group facing a second side, wherein a direction of the second side is opposite to a direction of a first side, the antenna elements are configured to provide a plurality of sensing beams to a target area, and the antenna elements are located at different relative positions of the lens group; and
    an image sensing element, disposed on the second side of the lens group and configured to sense a reflected light beam of the target area.

14. The image sensing device according to claim 13, wherein an optical imaging range of the lens elements on the optical axis gradually decreases from the first side to the second side.

15. The image sensing device according to claim 13, wherein beam directions of the sensing beams transmitted through the lens group are all different.

16. The image sensing device according to claim 13, wherein the sensing beams are respectively transmitted to different surface areas of the target area.

17. The image sensing device according to claim 13, wherein orthographic projections of the antenna elements on a reference plane surround an orthographic projection of the lens group on the reference plane, and an extension direction of the reference plane is perpendicular to an extension direction of the optical axis.

18. A head-mounted display, comprising:
an image sensing device, comprising:
a lens group, comprising a plurality of lens elements arranged along an optical axis;
a plurality of antenna elements, disposed on a side of the lens group facing a second side, wherein a direction of the second side is opposite to a direction of a first side, the antenna elements are configured to provide a plurality of sensing beams to a target area, and the antenna elements are located at different relative positions of the lens group;
an image sensing element, disposed on the second side of the lens group and configured to sense a reflected light beam of the target area; and
a main board, wherein the image sensing device is coupled to the main board via a signal line.

19. The head-mounted display according to claim 18, wherein an optical imaging range of the lens elements on the optical axis gradually decreases from the first side to the second side.

20. The head-mounted display according to claim 18, wherein beam directions of the sensing beams transmitted through the lens group are all different.

21. The head-mounted display according to claim 18, wherein the sensing beams are respectively transmitted to different surface areas of the target area.

22. The head-mounted display according to claim 18, wherein orthographic projections of the antenna elements on a reference plane surround an orthographic projection of the lens group on the reference plane, and an extension direction of the reference plane is perpendicular to an extension direction of the optical axis.

* * * * *